Figure 3:
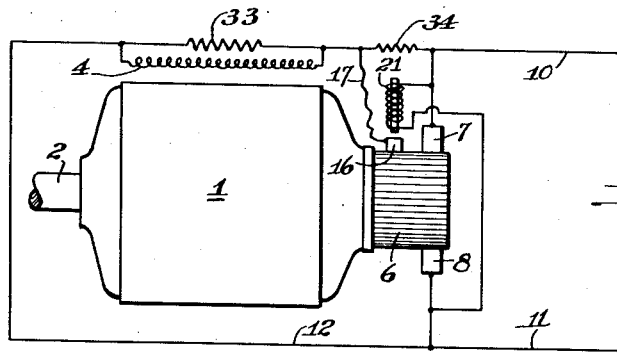

June 22, 1943.   E. I. SHOBERT, 2D   2,322,669
GENERATOR REGULATOR
Filed Feb. 11, 1941   2 Sheets-Sheet 1
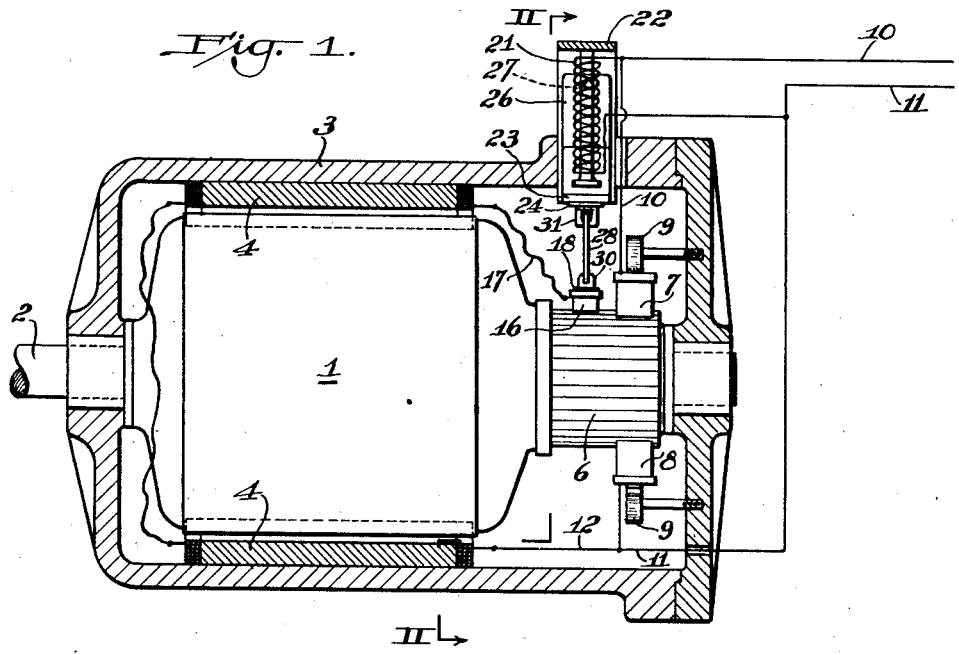
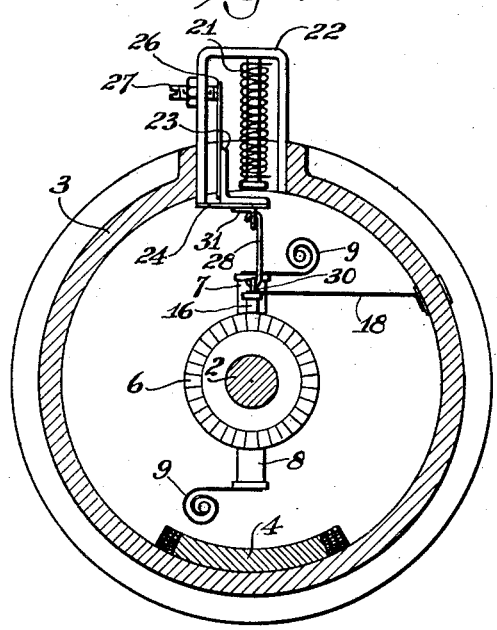
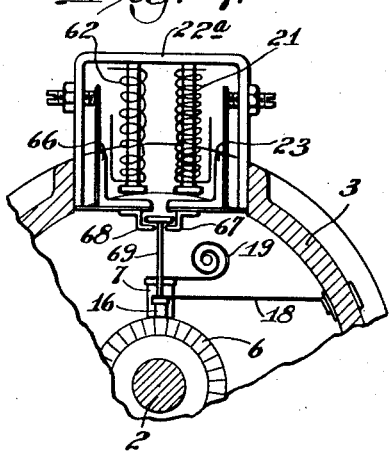
WITNESSES.
CBWallace
V.A. Peckham
INVENTOR.
Erle I. Shobert II
BY Brown, Critchlow & Flick
his ATTORNEYS.

Patented June 22, 1943

2,322,669

UNITED STATES PATENT OFFICE 2,322,669

GENERATOR REGULATOR

Erle I. Shobert, II, St. Marys, Pa., assignor to Stackpole Carbon Company, St. Marys, Pa., a corporation of Pennsylvania Application February 11, 1941, Serial No. 378,331

7 Claims. (Cl. 171—229)

This invention relates to apparatus for automatically regulating the output of generators, by which is meant either their voltage output or their current output, or both.

In the well known Tirill type of generator voltage regulator the field coil circuit of the generator is controlled by a switch that is opened by a solenoid shunted across the armature circuit of the generator. When the voltage output of the generator starts to exceed the maximum for which the solenoid has been set, the latter causes the field circuit switch to be opened whereby the voltage drops. This drop in voltage immediately causes the solenoid to permit the field circuit switch to close, so the voltage of the generator increases again. In practice this opening and closing of the field circuit switch may occure slowly or many times per second, depending upon the generator.

The switch is formed from a pair of electric contact members one of which is stationary and the other of which reciprocates toward and away from the stationary contact. As the switch operates, contact material leaves the contact face of one element and deposits on the abutting face of the other element, thereby producing a depression in the first contact and a projection on the other. After a time the projection starts to stick in the depression so that the switch does not open when it should, wherefore the voltage is permitted to become excessive. Even though there is no sticking, the contact between the switch elements is not broken at exactly the same point as it should be because it breaks between the surfaces of the projection and depression which do not separate until after the flat contact faces of the elements have separated. This changes the voltage regulating point for which the regulator was originally set. Both of the above mentioned difficulties result in improper charging of the battery, when the generator is used with a storage battery, and in burning out of the generator and equipment connected to it. These are serious and well known problems that confront the manufacturers of automotive vehicles and the like.

Another disadvantage of this type of regulation is that the size of the generator is limited. This too is a serious matter nowadays in the automotive field because so many auxiliary electrical devices, such as radios, heaters, fans, etc., are attached to automobiles that the usual generator is severely taxed. If a larger generator is used a higher contact temperature is produced in the regulator and a faster transfer of material from one contact to the other occurs. This results in change of the regulating point and sticking at an earlier date than with a smaller generator.

A further objection to Tirill regulation is that the regulator itself is relatively expensive, due to its construction and the difficulty of adjusting it.

It is among the objects of this invention to provide a generator output regulator which is of simple and inexpensive construction, which is easily adjusted, which does not stick, which does not change its regulating point by itself, which will last much longer than any comparable regulator known heretofore, and which can be used satisfactorily with generators of relatively high capacity.

According to this invention a pair of normally engaging, but separable, conductors of electricity are connected in the field coil circuit of a generator the output of which, either voltage, current, or both, is to be regulated. One of these conductors slides against the other in order to keep their contact surfaces smooth and clean, thus avoiding change of regulating point and sticking. Preferably, one of the conductors, which may be an element of the generator itself, rotates against the other conductor which is reciprocable. Means, such as electro-magnetic means operably connected to the reciprocable conductor and responsive to the output of the generator, is provided for effecting relative movement of the two conductors away from each other when the generator output reaches a predetermined amount, thereby momentarily cutting down the generator output and preventing it from exceeding that amount.

Figure 4:
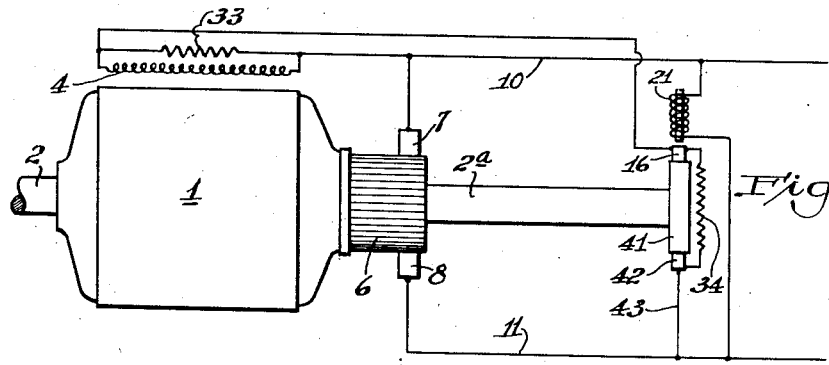
Figure 5:
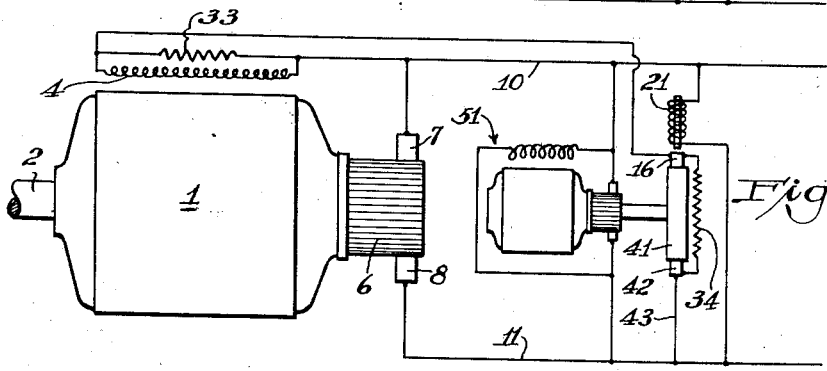
Figure 6:
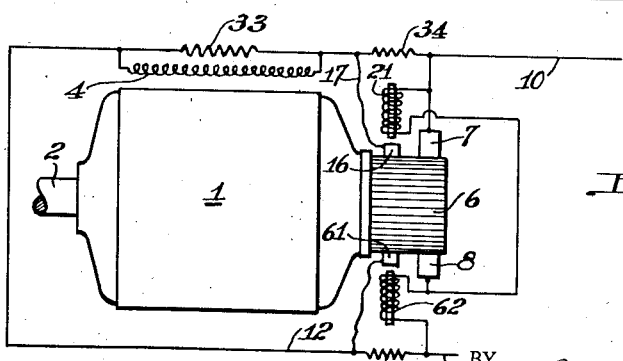

The invention is illustrated in the accompanying drawings in which Fig. 1 is a longitudinal section through an electric generator equipped with my voltage regulator and showing the armature in elevation; Fig. 2 is a transverse section taken on the line II—II of Fig. 1 minus wiring; Fig. 3 is a diagram of the circuit used with the generator of Figs. 1 and 2; Figs. 4 and 5 are diagrams of two modified embodiments of voltage regulation; Fig. 6 is a similar diagram according to which both the voltage and the current of a generator are regulated; and Fig. 7 is a fragmentary view, similar to Fig. 2, of a single regulator brush controlled by both voltage and current coils.

Referring to Figs. 1 and 2 of the drawings, a generator armature 1 is mounted on a shaft 2 journaled in the opposite ends of a surrounding metal case 3. One end of the shaft projects from the case and is adapted to be driven by a suitable source of power, such as an automobile engine. The field coils 4 of the generator are attached in the usual manner to the inside of the case at opposite sides of the armature and are excited from the armature current by being connected in shunt therewith in a manner to be described presently. At one end of the armature is the usual commutator 6 against which a pair of brushes 7 and 8 are pressed by springs 9 supported from the adjacent end wall of the case. The current generated by the rotating armature is carried away from it through these brushes and wires 10 and 11 leading therefrom. One end of the field coil circuit is connected by a wire 12 to wire 11 leading from brush 8, and the other end of the circuit is electrically connected to wire 10 by means of a switch which forms a material part of this invention.

It is a feature of this invention that the switch just mentioned does not stick and does not change its regulating point. Accordingly, the switch is formed from a pair of electrical conductors or contacts that normally are in sliding engagement with each other so that any transfer of material that occurs between them will not form a depression in one and a complementary projection on the other. As shown in the Fig. 1 embodiment, one of these electrical conductors is a small regulator contact member or brush 16 connected by a wire 17 to the adjacent field coil, and the other conductor is formed by the commutator of the generator. That is, regulator brush 16 is disposed beside generator brush 7 and they both simultaneously engage the same commutator segment or segments against which brush 16 is pressed by a flat spring 18 (Fig. 2) fastened at its outer end to the side of case 3. The field coil circuit is thus completed through wire 17, regulator brush 16, the adjoining portion of commutator 6, generator brush 7, and wire 10.

In order to regulate the voltage output of the generator the field coil circuit is opened every time the voltage attempts to exceed a predetermined amount, this being done by moving the regulating brush 16 away from the commutator. For this purpose a solenoid 21 is shunted across the armature circuit and operatively connected to the regulating brush so that it can pull that brush away from the commutator every time the voltage passing through the solenoid becomes sufficient. The solenoid is preferably mounted in a bracket 22 attached to the generator case and extending through a radial opening therein. When the solenoid is energized it attracts a metal bar 23 that is supported on a leaf spring 24 attached to the bottom of the bracket. The resistance that the bar offers to being drawn upwardly against the solenoid is controlled by means of another leaf spring 26 attached to the bar and extending upwardly within the bracket. The free upper end of this spring bears against the inner end of an adjusting screw 27 mounted in the side of the bracket, as shown in Fig. 2. Solenoid bar 23 is loosely connected to the regulating brush by a link 28 that is hooked through openings in lifting angles 30 and 31 attached to the brush 16 and the bar, respectively. To assure seating of the regulating brush against the commutator every time spring 18 is able to overcome the pull of the solenoid, which is many times per second, loose play is provided between the brush and bar 23 by making the link-receiving hole in lifting angle 31 oversize, as shown in Fig. 1. With this construction regulator brush 16 is not moved until the voltage output reaches the desired value, and until that time there likewise is no decrease in the spring pressure holding the brush against the commutator.

The principal causes of failure of generator brushes are the arcing that takes place between the edge of the brush and commutator bar as the latter leaves the brush, and the electrical wear caused by making and breaking the currents set up across the brushes by the voltage between adjacent commutator bars. The life of regulator brush 16 is not shortened by these effects because that brush is narrower than the adjacent generator brush 7 and is located between the extended planes of its opposite sides, as shown in Fig. 2. The main brush 7 which is in contact with the commutator all of the time keeps the voltage between adjacent commutator bars at a minimum, since it makes good electrical contact with adjacent bars and is a low resistance conductor. Thus, electrical wear of brush 16, due to short circuit currents, is minimized. The arcing or sparking that often takes place between a generator brush and the commutator bar leaving it is due to an inductive voltage generated between that brush and bar when the current in the armature coil connected to that bar is not completely reversed as the current in each coil of the armature should be as the commutator bars attached to those coils pass under the brushes. Such arcing is eliminated for regulator brush 16 because the commutator bars leave the adjacent main brush after leaving the regulator brush so that arcing must take place with only the main brush.

The invention described thus far is illustrated diagrammatically in Fig. 3 where the various elements bear the same numbers as they do in Figs. 1 and 2, although some of the mechanical elements are not shown in Fig. 3. On the other hand, Fig. 3 shows a resistance 33 shunted across the field coil 4 in order to absorb inductive voltage generated when the field circuit is open, and a resistance 34 connected to wires 10 and 17 to help snuff the arc that may be formed when regulating brush 16 is lifted from the commutator.

From the foregoing description the operation of my voltage regulator will be clear to those skilled in the art. It will be observed that it is of simple and inexpensive construction. It eliminates the separate mounting, the wiring from regulator to generator, and one of the voltage regulating switch contacts of the usual type of regulator now in use. The expense heretofore required in keeping the contacts clean during manufacture and assembly and in making the necessary fine adjustments with expensive equipment is avoided with my regulator. The conductors or contacts are self-cleaning, due to their sliding engagement, and it is a simple matter to adjust the regulator by merely turning adjusting screw 27 while the generator is operating and is connected to a voltmeter. All of this amounts to a very material saving. In addition to the saving in first cost there is the additional saving due to long life and freedom from trouble. Although material may be transferred between regulating brush and commutator, the sliding engagement of these two conductors prevents this transfer from making a depression in one conductor and a projection on the other which would cause sticking or at least change of regulating point. It will thus be seen that it is impossible for this regulator to stick, and it can be used just as satisfactorily with generators of much higher capacity than ordinarily are used in automotive vehicles and the like.

A modification of this invention is illustrated somewhat diagrammatically in Fig. 4 wherein the same elements bear the same numbers as before. The only difference between this form of the invention and that shown in Fig. 3 is that a separate rotating conductor ring is substituted for the generator commutator in the field coil circuit switch. Thus, the commutator end of generator shaft 2 is provided with an extension 2a on the outer end of which a metal conductor ring 41 is rigidly mounted coaxially. Regulating brush 16, instead of being pressed against the gegnerator commutator, bears against this ring away from which it is drawn many times per second by solenoid 21 shunted across the armature circuit. The circuit through ring 41 is completed by a brush 42 bearing against it constantly and connected by a wire 43 to generator wire 11. The other end of the field coil circuit is connected to generator wire 10. Arc snuffing resistance 34 is in this case shown connected directly to brushes 16 and 42. As in the case of the commutator of Fig. 3, the rotating conductor ring 41 of Fig. 4 makes sliding contact with regulator brush 16 and thereby prevents sticking or change of regulating point of this voltage regulator.

In the embodiment shown in Fig. 5 conductor ring 41 is driven directly by a small electric motor 51 instead of by the generator shaft. This motor, however, receives its power from the generator through wires 10 and 11.

In Fig. 6 there is illustrated diagrammatically an embodiment of the invention according to which both the voltage and the current output of the generator are regulated. The voltage regulating elements and circuit of this embodiment are the same as those of Fig. 3, but a similar system has been employed to regulate the current. That is, wire 12 of the field coil circuit is likewise provided with a switch formed from a second regulator brush 61 normally pressed against the generator commutator in the same way as regulating brush 16, and from the segment or segments of the commutator that engage brush 61 and adjacent generator brush 8 simultaneously.

To move regulator brush 61 out of contact with the commutator to open the field coil circuit, whenever the current output of the generator starts to exceed a predetermined amount, a solenoid 62 is connected in series in generator wire 11. This solenoid, its mounting, and mechanical connection to brush 61 may be similar to those shown in Figs. 1 and 2. A resistance 63, similar to resistance 34, is connected across wires 11 and 12. The voltage output of the generator is regulated by brush 16 moving in and out of contact with the generator commutator, while the current output is regulated in the same manner by brush 61, because when either brush is pulled away from the commutator momentarily the field coil circuit is broken.

It will be apparent that the embodiment of Fig. 6 can be modified to take the form of either Fig. 4 or Fig. 5 in which a separate conductor ring would be substituted for the generator commutator in the field coil circuit switch.

In Fig. 7 is shown a spring-pressed regulator brush 16 that can be lifted from the generator commutator by either of two solenoids, solenoid 21 being shunted across the armature circuit for voltage control as shown in the preceding figures of the drawings, and solenoid 62 being connected in series in the armature circuit as shown in Fig. 6. Both solenoids are supported by the same bracket 22a and, when energized, attract resiliently and adjustably mounted metal bars 23 and 66. In order that either one of the solenoids may lift the regulator brush independently of the other, the bottoms of metal bars 23 and 66 are provided with lifting members 67 and 68, respectively, between which freely extends a headed pin 69 rigidly attached to the brush 16. Loose play is provided between the brush and solenoid bars 23 and 66 by making pin 69 long enough to normally space its head from lifting members 67 and 68. This construction of regulator is cheaper and simpler than the type illustrated in Fig. 6.

According to the provisions of the patent statutes, I have explained the principle and mode of operation of my invention and have illustrated and described what I now consider to represent its best embodiments. However, I desire to have it understood that, within the scope of the appended claims, the invention may be practiced otherwise than as specifically illustrated and described.

I claim:

1. A generator voltage and current regulator comprising a rotatable electrical conductor, a pair of reciprocable electrical conductors, resilient means pressing each reciprocable conductor against the rotatable conductor, said conductors being adapted to be connected in a generator field circuit, electromagnetic means adapted to be shunted across the generator armature circuit, electromagnetic means adapted to be connected in series in the generator armature circuit, and means including a lost motion connection for operatively connecting each of said magnetic means to one of said reciprocable conductors whereby to move one of the latter away from said rotatable conductor when the generator voltage reaches a predetermined value and to move the other reciprocable conductor away from said rotatable conductor when the generator current reaches a predetermined value.

2. A generator output regulator comprising a rotatable electrical conductor, a reciprocable contact member, means for urging said contact member against said conductor, said conductor and contact member being adapted to be connected in a generator field circuit, electrically actuated means adapted to be connected in the generator armature circuit, a lifting member connected to said contact member and provided with an opening, a lifting member connected to said electrically actuated means and provided with an opening, and a link hooked through said openings for connecting said lifting members, one of said openings being oversize to provide loose play in the connection.

3. A generator voltage and current regulator comprising a rotatable electrical conductor, a reciprocable conductor, means pressing the reciprocable conductor against the rotatable conductor, said conductors being adapted to be connected in a generator field circuit, electromagnetic means adapted to be shunted across the generator armature circuit, electromagnetic means adapted to be connected in series in the generator armature circuit, and means including a lost motion connection for operatively connecting each of said magnetic means to said reciprocable conductor whereby to move the latter away from said rotatable conductor whenever the generator voltage reaches a predetermined value and whenever the generator current reaches a predetermined value.

4. A generator output regulator comprising a rotatable electrical conductor, a reciprocable contact member, means for urging said contact member against said conductor, said conductor and contact member being adapted to be connected in a generator field circuit, electrically actuated means adapted to be connected in the generator armature circuit, a lifting member connected to said electrically actuated means and provided with a laterally projecting portion, and a headed member connected to said contact member with its head overlapping said laterally projecting portion of the lifting member in spaced relation thereto on the side remote from the contact member whereby to provide loose play between said headed member and said lifting member.

5. A generator output regulator comprising a rotatable electrical conductor and a reciprocable electric contact member each adapted to be electrically connected in a generator field circuit, means normally pressing the contact member against said rotatable conductor, an electromagnet adapted to be electrically connected in and energized by the generator armature circuit, a vibratable armature for said magnet movable toward and away from said contact member, and lost-motion connecting means attached to the armature and to the contact member for limiting said movement of the armature away from the contact member whereby to operatively connect them after the armature moves away a predetermined distance so that further movement of the armature in the same direction moves the contact member away from said rotatable conductor to break said field circuit.

6. A generator output regulator comprising a rotatable electrical conductor and a reciprocable contact member each adapted to be electrically connected in a generator field circuit, resilient means normally pressing the contact member against said rotatable conductor, an electromagnet adapted to be electrically connected in and energized by the generator armature circuit, a vibratable armature for said electromagnet, resilient means independent of said first-mentioned resilient means for normally spacing said armature from the electromagnet, and lost-motion means including a slack connection between said armature and said contact member that leaves the latter inoperatively connected to the armature until the armature moves toward the magnet a predetermined distance that takes up the slack in the connection, whereupon the armature is operatively connected to the contact member and pulls it out of engagement with the rotatable conductor to break the field circuit.

7. A generator output regulator comprising a rotatable electrical conductor and a reciprocable electric contact member each adapted to be electrically connected in a generator field circuit, means normally pressing said contact member against said conductor, an electromagnet adapted to be connected in and energized by the generator armature circuit, a vibratable armature for said magnet normally spaced therefrom, separate connecting members attached to said contact member and to said armature and having interengageable end portions for connecting the armature to the contact member, said end portions having a pair of opposed contact surfaces extending transversely of the direction of reciprocation of said contact member and being normally spaced apart to leave the contact member undisturbed by initial movement of said armature away from the rotatable conductor, said surfaces impacting against each other after said initial movement to pull the contact member away from the rotatable conductor whereby to open said field circuit.

ERLE I. SHOBERT, II.